Nov. 3, 1970
W. P. PIERSON ET AL
3,537,320
DUAL PRESSURE RATIO TRANSDUCER
Filed Aug. 19, 1968
2 Sheets-Sheet 1
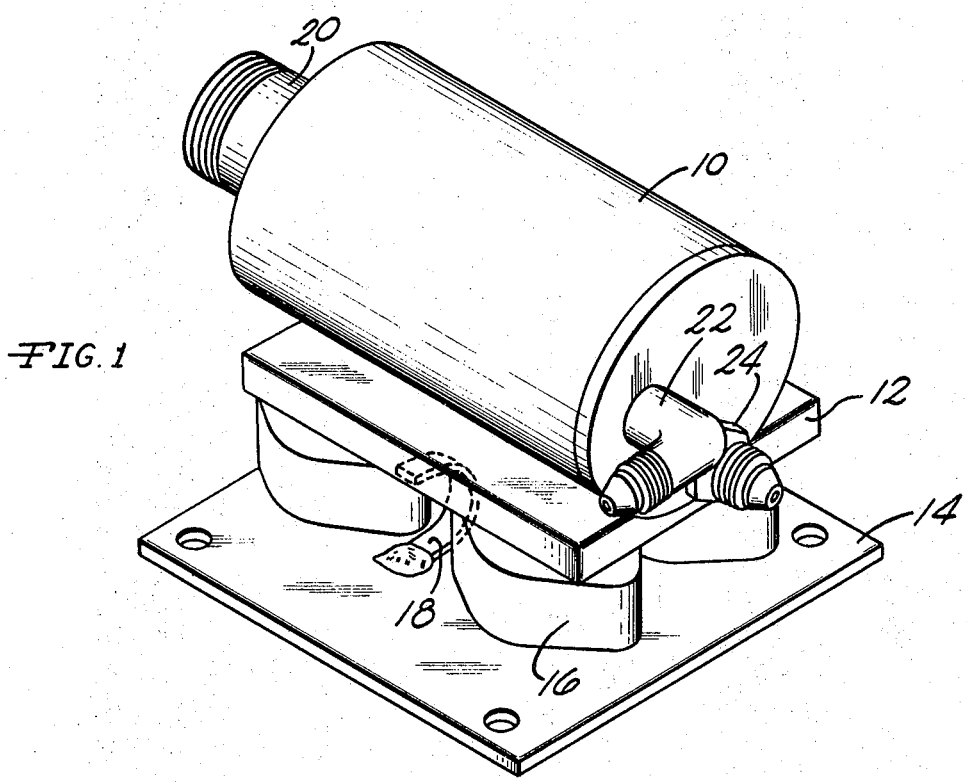
FIG. 1
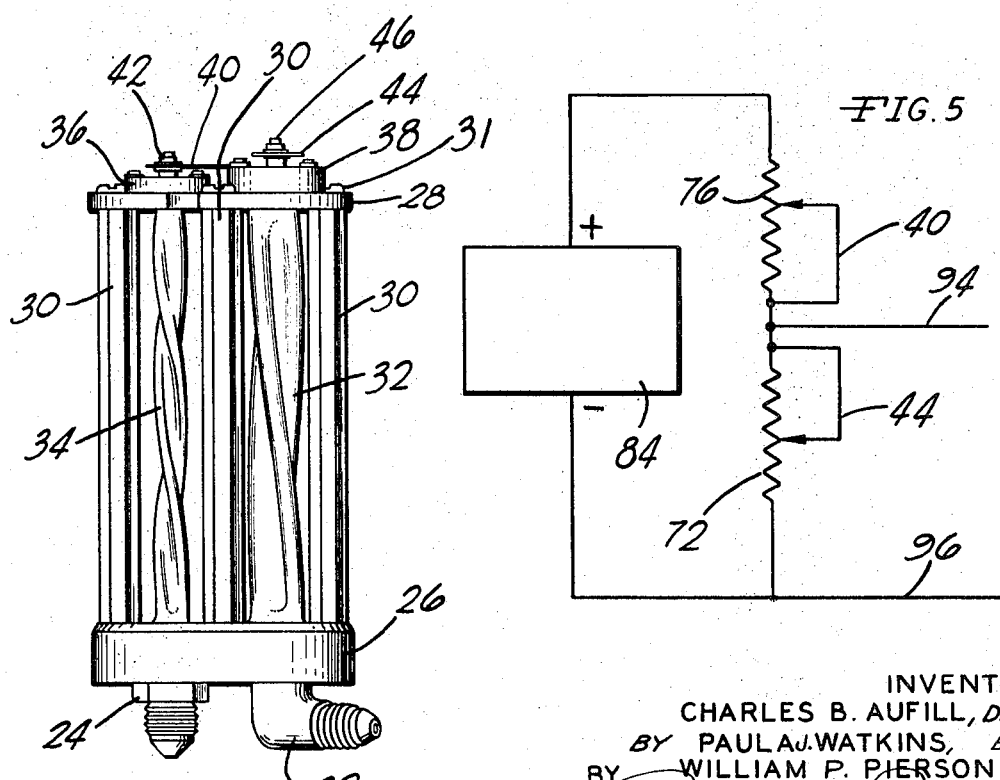
FIG. 2
FIG. 5
INVENTOR
CHARLES B. AUFILL, DEC'D.
BY PAULA J. WATKINS, EXR'X.
BY WILLIAM P. PIERSON
Beaman & Beaman
ATTORNEYS INVENTOR
CHARLES B. AUFILL DEC'D.
BY PAULA J. WATKINS EXR'X.
WILLIAM P. PIERSON
BY
Beaman & Beaman
ATTORNEYS United States Patent Office 3,537,320
Patented Nov. 3, 1970

1

3,537,320
DUAL PRESSURE RATIO TRANSDUCER
William P. Pierson, Albuquerque, N. Mex., and Charles B. Aufill, deceased, late of Albuquerque, N. Mex., by Paula J. Watkins, executrix, assignors to Sparton Corporation, Jackson, Mich., a corporation of Ohio
Filed Aug. 19, 1968, Ser. No. 753,790
Int. Cl. G01i 13/02
U.S. Cl. 73—398         6 Claims

ABSTRACT OF THE DISCLOSURE

A pressure transducer capable of producing an electrical signal proportional to the ratio of pressure differences utilizing a pair of pressure sensing elements, preferably having different physical characteristics, mounted in an airtight housing maintained under predetermined pressure conditions to insure a uniform and consistent pressure differential reading.

BACKGROUND OF THE INVENTION

The invention pertains to the field of pressure transducers wherein a plurality of transducer-sensing elements are utilized to permit a comparison of different pressures under uniform conditions in order to insure the accuracy of pressure comparison.

It is known to use a pair of gauges, or pressure-sensing devices, in order to produce a comparison between pressures. For instance, gauges are often used to compare inlet and outlet pressures of pumps and other fluid handling systems. Usually, the inlet and outlet pressure reading devices are mounted adjacent each other on a control panel whereby the pressure differential may be mentally calculated by comparing the readings of the gauges. Also, it is known with more sophisticated systems to automatically provide means for comparing pressure differences, and pressure-sensing devices employed in conjunction with electrical control devices have been used in such applications. However, one of the problems with automatic equipment of this type arises from the calibration of a plurality of pressure-sensing devices and the maintaining of the pressure conditions adjacent the devices so that consistent comparison can be made under all conditions.

In the operation of jet and turbine engines it is often desired to obtain an indication of the temperature conditions within the engine. Actual measurement of the engine temperatures is most difficult for a number of reasons. Accordingly, one of the methods utilized to calculate the internal engine temperatures within a turbine or jet engine is to make a comparison between the pressure of the air going into the engine as compared with the engine discharge pressures. By the use of electronic comparative apparatus it is possible to interpret this pressure difference in conjunction with other factors to interpolate the internal engine temperature. The apparatus of the invention is particularly suited for this type of application, especially with jet aircraft, and is capable of producing highly reliable information under severe operating conditions and at all altitudes.

SUMMARY OF THE INVENTION

The invention discloses a transducer having an airtight casing in which a predetermined and controlled atmosphere is maintained. Within this casing a pair of pressure sensing elements in the form of twisted or fluted tubes of an elongated configuration are mounted whereby the effective surfaces of the elements are subjected to the controlled pressure conditions within the casing. One end of the sensing elements is fixed relative to the casing and the other end is rotatable and is operatively associated with electrical control means in the form of potentiometers. A potentiometer tap is attached to the rotatable end of each element and the tap cooperates with a resistance coil in the known manner.

Fittings are defined in the casing permitting communication with the interior of the sensing elements, and the pressures to be sensed communicate with the sensing elements by conduits affixed to these fittings.

The potentiometers are wired together in such a manner that a reference voltage proportional to the difference in pressure within the sensing elements is produced. This reference voltage may be introduced into suitable readout apparatus to produce an engine temperature reading, or reading for other purposes, determined by the pressure ratio between the sensing elements.

It would be possible for the sensing elements to have identical physical characteristics. However, in the preferred embodiment of the invention the physical characteristics of the sensing elements are different whereby a high-pressure and a low-pressure may be accurately compared, and the difference in physical characteristics of the sensing elements permits accurate interpolation of the pressures within the sensing elements over a wide range of pressures.

BRIEF DESCRIPTION OF THE DRAWINGS

The aforementioned objects of the invention arising from the details and relationships of the components in an embodiment of the invention will be apparent from the following description and accompanying drawings wherein:

FIG. 1 is a perspective view of the transducer in accord with the invention,

FIG. 2 is an elevational view of the transducer in accord with the invention, the casing being removed, FIG. 5 is an electrical circuit diagram illustrating a type of circuit which may be used with the transducer of the invention.

DESCRIPTION OF THE PREFERRED EMBODIMENT

Figure 3:
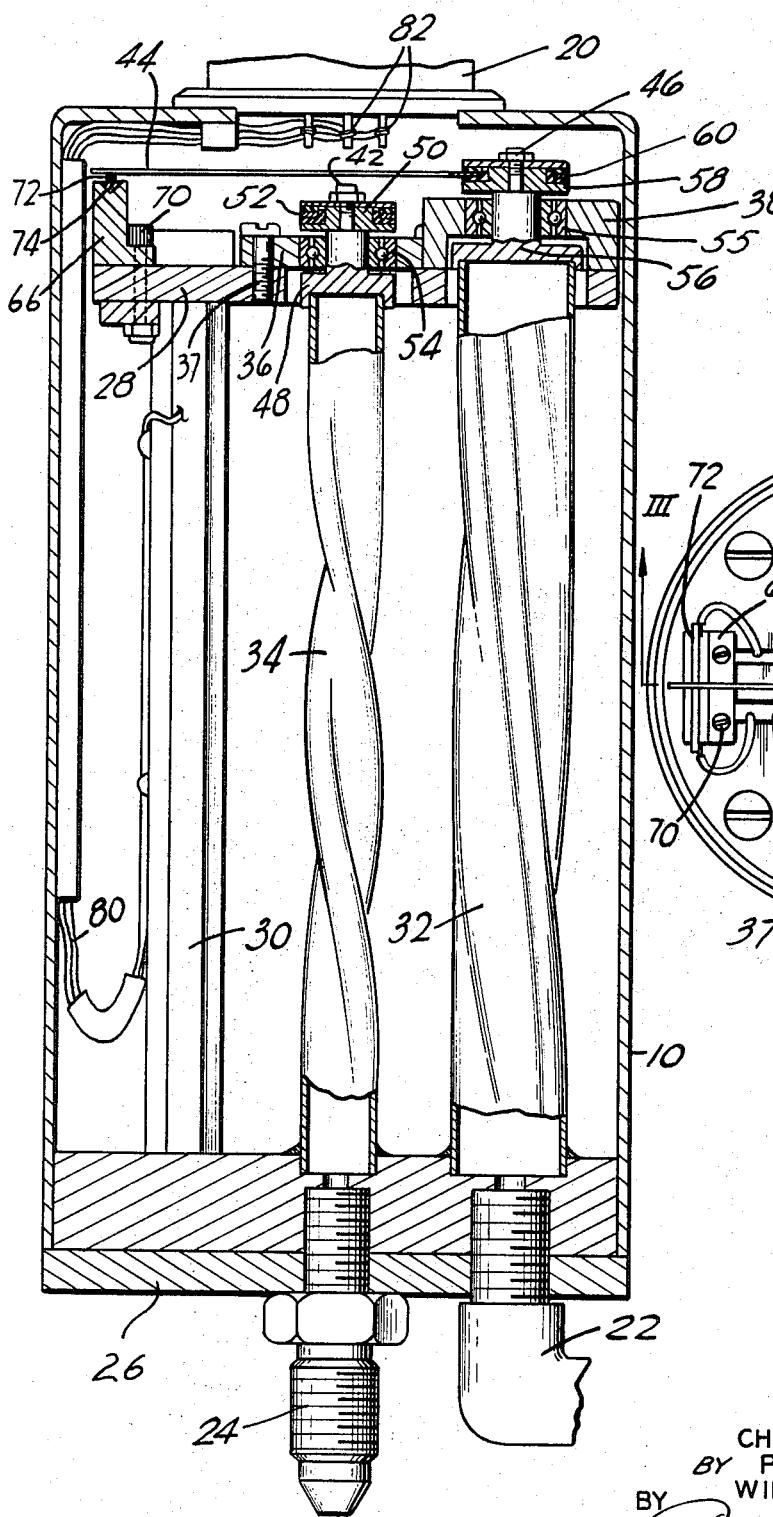
FIG. 3 is an elevational, sectional view of the transducer in accord with the invention as taken along Section III—III of FIG. 4.
Figure 4:
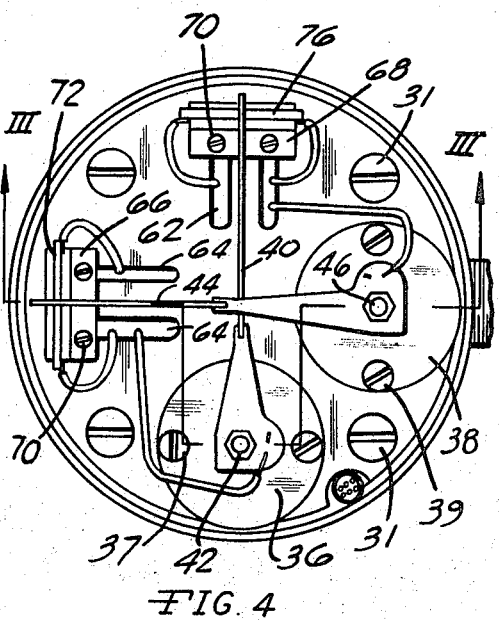
FIG. 4 is a top plan view of FIG. 2, shown on an enlarged scale.

A typical installation mounting is shown in FIG. 1 wherein the transducer casing 10 is mounted upon a base block 12. The block 12 is, in turn, affixed to a mounting plate 14 by means of vibration absorbing elements 16 which may be formed of rubber, or other material capable of absorbing vibration and shock. Grounding between the block 12 and the plate 14 is accomplished by means of the grounding strap 18.

The electrical connections to the transducer are made through a neck or sleeve 20 attached to one end of the casing 10. The lower end of the casing 10 is sealed by a head 26 in which pressure inlet fittings 22 and 24 are defined. The head 26 is attached to the casing 10 in such a manner that an airtight chamber is defined by the casing and head.

Within the casing a plate 28 is maintained in parallel spaced relationship to the head 26 by means of a plurality of elongated spacers 30 fixed to the plate 28 by screws 31. These spacers 30 may be attached to the head 26 by screws, welding, soldering, or the like.

The tubular pressure-sensing elements extend between the head 26 and the plate 28. The low-pressure element is represented at 32 and the high-pressure element is represented at 34. The elements 32 and 34 are preferably of similar construction, although the pitch of the twist or flutes is greater in the low-pressure tube 32. The tubes 32 and 34 are twisted or fluted in such a manner that internal pressures cause the tubes to tend to untwist, producing a rotating motion. The ends of the tubes 32 and 34, adjacent the two-piece head 26, are affixed to the head by soldering, as is apparent in FIG. 3. In this manner the portion of the tubes adjacent the head 26 is fixed relative to the casing 10.

A bearing support 36 is affixed to the plate 28 by screws 37 and a bearing support 38, of greater axial thickness than the support 36, is affixed to the plate 28 by screws 39.

A potentiometer tap 40 is attached to the end of the tube 34 by means of a shaft 42, and the potentiometer tap 44 is attached to the shaft 46 associated with the free end of the tube 32. The shaft 42 is mounted upon the tube 34 by means of the cap 48 which is soldered to the tube. A hub 50 is attached to the shaft 42 and, by means of insulation 52, the tap 40 is insulated from the casing and sensing element 34. The cap 48 is rotatably mounted in the bearing support 36 by antifriction bearing means 54.

The structure associated with the tube 32 is similar to that previously described relative to the tube 34. A cap 56 encloses the free end of the tube 32 and the hub 58 supports the tap 44 in an insulated manner by means of insulation 60. Bearing 55 produces rotatable mounting of the cap 56.

A pair of slots 62 is defined in the plate 28 in a generally diametrical relationship to the tube 34. In like manner, slots 64 are defined in the plate 28 generally diametrically related to the tube 32. A resistance coil support 66 is mounted upon the plate 28 in generally opposed relation to the tube 32 and the coil support 68 is related in like manner to the tube 34. Screws 70 maintain the supports 66 and 68 upon the plate 28. The support 66 supports a resistance coil 72 upon an insulating element 74. In like manner, the support 68 supports the resistance coil 76 upon a similar insulating element. Conductors 80, FIG. 3, are associated with the resistance coils and the sensing element taps, and the tap 44 engages the resistance coil 72 to form a potentiometer, while the tap 40 engages the coil 76 to form a second potentiometer. The conductors 80 interconnect the electrical components of the transducer, preferably in a manner shown in FIG. 5, and the electrical conductors are soldered to terminals 82 which pass through the sleeve 20 in an airtight manner.

The preferred arrangement for wiring the transducer is shown in FIG. 5. A positive and negative potential voltage source is shown at 84, and resistance coils 72 and 76 are connected in the manner illustrated. The taps 40 and 44 are associated with a conductor 94, while the negative potential is associated with a conductor 96. The conductors 94 and 96 are connected to an electronic interpolating device, not shown, which evaluates the voltage potential produced by the relative position of the taps 40 and 44 on the coils 76 and 72, respectively, to give a reading.

In operation, the transducer 10 may be mounted in a jet aircraft, for instance, and the fitting 24 is connected to a conduit having an inlet associated with the input or the compressor of the engine. The fitting 22 is connected to a conduit communicating with the outlet end, or exhaust, of the jet engine. Usually, the interior of the transducer 10 will be evacuated, although a standard pressure could be maintained therein, if desired, and inert gases, or the like, could be used to maintain a noncorrosive or water vapor-free environment. In that the interior of the casing 10 is maintained at a given pressure, and as both the sensing elements 32 and 34 are always subjected to an identical exterior pressure, the original calibration of the sensing elements will maintain consistency throughout the normal operating range of the transducer and as the fluctuation of the pressure within the sensing elements occurs the positions of the taps upon the resistance coils will vary as the sensing element tubes twist and untwist as the internal pressure changes.

The wiring of the potentiometers, as shown in FIG. 5, permits a voltage to be produced proportional to the pressure differential between the pressures within the sensing elements. For instance, the range of operation of the sensing element 32 will be between 0 and 16 p.s.i., while the operating range of the tube 34 would normally be between 0 and 200 p.s.i. Thus, it will be appreciated that the transducer of the invention is capable of producing a voltage proportional to pressure differences occurring at spaced locations, and an accurate pressure differential indication can be readily obtained. The rugged character of the transducer makes its use in high vibration environments, such as jet aircraft, practical, yet the transducer size can be maintained concisely.

It is appreciated that various modifications to the inventive concept may be apparent to those skilled in the art without departing from the spirit and scope thereof.

What is claimed is:

1. A dual pressure ratio transducer comprising, in combination, an airtight casing, first and second elongated, hollow tube pressure-sensing elements having different pressure sensing characteristics within said casing each constituting a separate chamber within said casing and each having a spiraled configuration and each having a first end fixed with respect to said casing and a second closed end, first and second variable potentiometer means operatively connected to said second end of said sensing elements, respectively, having electrical values determined by the pressure within the associated element, a first pressure inlet defined in said casing communicating with the interior of said first element, a second pressure inlet defined in said casing communicating with the interior of said second element, and electrical connection means interconnecting said potentiometers to provide an electrical signal proportional to the pressure differential within said elements.

2. A dual pressure ratio transducer as in claim 1 wherein the pitch of the spiral of said first sensing element is greater than the pitch of the spiral of said second sensing element.

3. A dual pressure ratio transducer as in claim 1 wherein said first variable potentiometer means comprises a first resistance and a first tap operated by said first sensing element, and said second potentiometer means comprises a second resistance and a second tap operated by said second sensing element, a positive electrical potential connected to said first resistance, a negative electrical potential connected to said second resistance, a first reference voltage conductor connected to one of said potentials, and a second reference voltage conductor connected to said taps.

4. A dual pressure ratio transducer as in claim 3 wherein said first and second resistances are connected in series, said taps and said second conductor being connected to said taps and resistances intermediate said resistances.

5. A dual pressure ratio transducer comprising, in combination, an airtight casing, first and second linear, elongated, pressure-sensing hollow tubes having different pressure sensing characteristics within said casing each having a longitudinal axis and a wall spirally twisted about the longitudinal axis, the axis of each element being located within the wall of the associated tube, each tube having a first end fixed with respect to said casing and a second closed end located within said casing and capable of angular rotation about its associated axis, a first pressure inlet communicating with said first tube first end, a second pressure inlet communicating with said second tube first end, first and second variable potentiometers within said casing each having a tap and a resistance coil engaged thereby, means connecting the tap of said first potentiometer to said second end of said first tube, means connecting the tap of said second potentiometer to said second end of said second tube, and electrical connection means interconnecting said potentiometers to provide an electrical signal proportional to the pressure differential within said tubes.

6. In a dual pressure ratio transducer as in claim 5 wherein the pitch of the spiral defined in the wall of said first tube is greater than the pitch of the spiral defined in the wall of said second tube.

References Cited

UNITED STATES PATENTS

| | | | |
|---|---|---|---|
| 3,247,716 | 4/1966 | Ranke | 73—412 XR |
| 3,013,233 | 12/1961 | Bourns | 73—412 XR |
| 3,346,830 | 10/1967 | Ankeny | 73—398 XR |
| 3,411,362 | 11/1968 | Arasim | 73—398 |

DONALD O. WOODIEL, Primary Examiner

U.S. Cl. X.R.

73—412, 418